United States Patent
Tanaka

[11] Patent Number: 5,637,054
[45] Date of Patent: Jun. 10, 1997

[54] GEAR DECISION SYSTEM FOR AUTOMATIC TRANSMISSION

[75] Inventor: Toru Tanaka, Tokyo, Japan

[73] Assignee: Mitsubishi Denki Kabushiki Kaisha, Tokyo, Japan

[21] Appl. No.: 581,209

[22] Filed: Dec. 29, 1995

[30] Foreign Application Priority Data

Sep. 13, 1995 [JP] Japan .................................. 7-235280

[51] Int. Cl.$^6$ .................................................. B60K 41/06
[52] U.S. Cl. .......................................... 477/111; 477/107
[58] Field of Search .......................... 477/99, 107, 111, 477/906, 115

[56] References Cited

U.S. PATENT DOCUMENTS

| | | | |
|---|---|---|---|
| 4,364,343 | 12/1982 | Malik | 123/179 B |
| 4,702,127 | 10/1987 | Cote | 477/906 |
| 4,945,484 | 7/1990 | Cote et al. | 477/906 |
| 5,036,728 | 8/1991 | Kawasoe et al. | 477/107 |
| 5,188,070 | 2/1993 | Otsuka et al. | 123/179.23 |
| 5,252,861 | 10/1993 | Steeby et al. | 477/99 |

FOREIGN PATENT DOCUMENTS 3109137  5/1991  Japan .

*Primary Examiner*—Charles A. Marmor
*Assistant Examiner*—Sherry Lynn Estremsky
*Attorney, Agent, or Firm*—Sughrue, Mion, Zinn, Macpeak & Seas

[57] ABSTRACT

A gear decision system for an automatic transmission which compulsorily decides in a no-load state only for a predetermined time period to avoid an erroneous decision even if a start decision result is not identical to a starter behavior during cranking and a no-load switch represents an in-gear state. The system comprises a sensor 8 for outputting a reference signal CA, a sensor 17 for sensing a turbine speed Rt, a switch 19 for outputting a signal NL indicative of a no-load state on the basis of a shift lever position, a unit 21 for deciding on an engine stopping state on the basis of the reference signal CA, a unit 22 for comparing the turbine speed Rt with a first set value, a unit 23 for deciding on a speed change state on the basis of the reference signal CA, the signal NL and the turbine speed Rt, a unit 24 for deciding on a starting state, and a unit 25A for deciding on an in-gear state on the basis of the decision results E, H, G and St and the signal NL. When the in-gear state is indeterminable, a decision is made, over a predetermined time period, that the automatic transmission is in the out-of-gear state.

4 Claims, 7 Drawing Sheets

GEAR DECISION SYSTEM FOR AUTOMATIC TRANSMISSION

BACKGROUND OF THE INVENTION

1. Field of the Invention

The present invention relates to a gear decision system for an automatic transmission (speed change gear) which decides whether or not the automatic transmission establishes an in-gear state (linking state) and which is available for control of an engine of a motor vehicle, and more particularly to an automatic transmission gear decision system which surely prevents erroneous decisions to improve reliability for various control.

2. Description of the Prior Art

As a rule, in a motor vehicle equipped with an automatic transmission, its starter is designed to operate (come into the on-condition) when its shift lever takes the N (neutral) position or the P (parking) position and further its automatic transmission does not establish an in-gear state (out of gear), that is, when the engine is in no-load condition. In addition, the decision on the in-gear state of the automatic transmission depends upon various operating conditions, while the decision result is reflected in various control. For this reason, an accurate decision on the in-gear state is necessary. For the decision on the in-gear state, an engine control system of such a motor vehicle includes a gear decision unit responsive to, for example, a no-load switch.

FIG. 6 illustrates an arrangement of an engine control system including a prior art gear decision unit for an automatic transmission. In the illustration, air A to be sucked into an engine 1 is taken in through an air cleaner 2 from the atmosphere and then passes through an air quantity sensor 3 for sensing an intake air quantity Qa, a duct 4 making up an intake pipe and a throttle valve 5 for adjusting the intake air quantity Qa in sequence, and thereafter is led into cylinders 6.

The output signal of the air quantity sensor 3 representative of the intake air quantity Qa is inputted into a control unit (which will be referred hereinafter to as an ECU) 10. The ECU 10, comprising a microcomputer, serves as a variety of control means, automatic transmission gear decision means and so on as will be described later. A throttle sensor 7 is provided in connection with the throttle valve 5 so as to sense an opening degree θ of the throttle valve 5, and issues a signal indicative of the throttle opening degree θ and supplies it to the ECU 10. Further, a crank angle sensor 8 is attached onto a crank shaft K of the engine 1 to sense given crank angles in response to the rotation of the engine 1, and produces a reference signal CA being a pulse generated at every reference angle and delivers it to the ECU 10.

A starter 9 comprising a motor provided on the engine 1 is connected through a starter switch 11 associated with a keyswitch (not shown) to a battery B so that it is driven by the operation of the starter switch 11 to start the engine 1. An injector 12, being controlled in accordance with a fuel injection signal CF from the ECU 10, is located at an upstream side of each cylinder 6 to mix the air A with fuel F pressurized and delivered from a fuel tank (not shown) by means of a pump and to supply the mixture into each cylinder 6. Further, an ignition coil 13, being controlled in accordance with an ignition signal CP from the ECU 10, generates a high voltage E to operate an ignition plug 14 placed in each cylinder 6. The exhaust gas, produced by the combustion of the mixture within each cylinder 6 of the engine 1 due to the discharge of the ignition plug 14, is released through an exhaust pipe and a catalyst (not shown) toward the atmosphere.

An automatic transmission 18, being controlled in accordance with a speed change signal CG from the ECU 10, accomplishes an aiming gear shift (gear position) using a solenoid 15 operable by the speed change signal CG therefrom. In connection with the automatic transmission 18, there are provided a vehicle speed sensor 16 attached onto the output shaft of the automatic transmission 18 to sense the speed V of the motor vehicle and a turbine speed sensor 17 for sensing the speed Rt of a turbine located inside the automatic transmission 18. The vehicle speed V and turbine speed Rt from these sensors 16, 17 are inputted as speed change information to the ECU 10. Furthermore, in conjunction with a shift lever (not shown) manipulated by the vehicle driver, there is placed a no-load switch 19 which is made to come into the on-state when the shift lever takes the N position or the P position. Under the conditions that the shift lever takes the N or P position and the no-load state is detected, the no-load switch 19 supplies the ECU 10 with a no-load signal NL, for example, taking a low-level state.

FIG. 7 is a block diagram showing a portion of a functional arrangement of the ECU 10. In this instance, a signal is not inputted from the starter switch 11 to the ECU 10 from the viewpoint of cost reduction. The ECU 10 includes a start decision means 24 for outputting a start signal St in response to the detection of the on-state (the start-up) of the starter 9 and a gear decision means 25 for checking, on the basis of the no-load signal NL and the start signal St, whether or not the automatic transmission is in gear so as to transmit a power. The start decision means 24 outputs a decision result, i.e., the start signal St indicative of the start-up on the basis of information other than the starter switch 11 information, for example, when the engine speed Re corresponding to the turbine speed Rt is below a given set value Reo (the engine speed at cranking, approximately 300 rpm). In general, in an automatic transmission 18 mounted motor vehicle, the cranking state occurs only when the automatic transmission 18 is not in the power transmitting condition. Accordingly, the starter 9 is designed to get into the on-condition only when the gear decision means 25 decides that the automatic transmission 18 is not in the power transmitting condition.

FIG. 8 is an illustration of an arrangement of a control function of the starter 9 such as disclosed in Japanese Published Unexamined Patent Application No. 3-109137, where a relay L is used as a driving circuit for the starter 9. The relay L, controlled with the ECU 10, is composed of a relay coil LC energized by a relay signal CL from the ECU 10 and a relay switch LS closed in response to the energization of the relay coil LC. The relay switch LS is coupled in series to the starter 9. In this case, not only the no-load switch 19 but also a brake switch BS are in connecting relation to the ECU 10, and the brake switch BS supplies a brake signal BK to the ECU 10 in a state where the vehicle driver presses the brake pedal. The ECU 10 turns on the relay L to operate the starter 9 only when the no-load switch 19 is in the on-state and the brake pedal is in a pressed state (the brake switch BS is in the on-state).

Furthermore, it is also possible that as shown in FIG. 9 the function of the relay L is achieved with a hardware arrangement and the starter 9 is made so as not to rotate when the automatic transmission 18 takes the in-gear state. In FIG. 9, the no-load switch 19 is interposed between the starter 9 and the starter switch 11 and the no-load voltage EN at the junction (node) between the no-load switch 19 and the starter switch 11 is inputted to the ECU 10. More specifically, the no-load voltage EN is pulled up to the power supply voltage, before being applied to an input terminal of a CPU (central processing unit) within the ECU 10.

Secondly, a description will be made hereinbelow with reference to FIGS. 6 to 9 in terms of an operation of the prior automatic transmission gear decision system. As a rule, in the case that the engine 1 starts in a state with having been in the stopped condition, the starter switch 11 is turned on through the manipulation of the keyswitch. In this case, as shown in FIG. 9, a current flows into the starter 9 only when the shift lever takes the N or P position (the no-load switch 19 is in the operated state), that is, only at the time of the no-load condition, so that the starter 9 can rotate to start the engine 1. Further, if at this time the start decision means 24 (see FIG. 7) outputs the start signal St indicative of the fact that the engine 1 is on the start-up, the gear decision means 25 decides that the automatic transmission 18 takes the out-of-gear state, irrespective of the state of the no-load switch 19 (the presence or absence of the no-load signal NL).

Now, let it be assumed that the vehicle driver is driving the motor vehicle and operating the shift lever and the accelerator pedal. At this time, if the no-load switch 19 is in the on-state (the shift lever takes the N or P position), as obvious from FIG. 9 the no-load potential EN at one end of the no-load switch 19 falls to the ground level through the starter 9 and the input voltage (no-load signal NL) at the CPU within the ECU 10 goes low in level. Accordingly, the decision of the CPU is that the automatic transmission 18 takes the out-of-gear state. On the other hand, if the no-load switch 19 is in the off-state, since the input potential (no-load signal NL) to the CPU goes high in level, the decision of the CPU is that it is in the in-gear state.

As a rule, in the engine control the fuel injection quantity varies in accordance with the in-gear state decision result, and hence the in-gear state decision is the information important for the engine system control and a high reliability is necessary. This also applies to the operation at start-up. However, the time of the in-gear state decision is not always coincident with the time at which a current actually flows into the starter 9. For example, as shown in a time chart of FIG. 10, when the speed Re of the engine 1 exceeds the set value Reo while the cranking starts and continues, then during that time the start decision means 24 decides, irrespective of the engine 1 being actually in a starting condition, that it is not in the starting condition and, hence, does not the start signal St. Moreover, if the circuit is arranged as shown in FIG. 9, the starter switch 11 comes into the on-state during the cranking even if the shift lever takes the N or P position (the no-load switch 19 is in the on-state), with the result that the input potential to the CPU comes into a high level and the ECU 10 makes a decision that the automatic transmission 18 is in the in-gear state (see FIG. 10). Accordingly, since the CPU decides in the in-gear state during the cranking regardless of whether or not the automatic transmission 18 actually takes the in-gear state (the shift lever actually takes the N or P position), there is a possibility that the start-up of the engine 1 and the exhaust gas deteriorate.

Therefore, the prior automatic transmission gear decision system suffers from a problem that, because as described above the start decision means 24 decides the start-up on the basis of the engine speed Re and the like but not using the starter switch 11 information, the time that the decision is made on the in-gear state is not always coincident with the time that a current actually flows into the starter 9 and, irrespective of actually the automatic transmission 18 being in the out-of-gear state, during the cranking the decision is made that the automatic transmission 18 is in the in-gear state, with the result that the start-up of the engine 1 and the exhaust gas deteriorate.

SUMMARY OF THE INVENTION

The present invention has been developed with a view to eliminating this problem, and it is therefore an object of the present invention to provide an automatic transmission gear decision system which compulsorily makes a decision on the no-load state only for a predetermined time period even if the start decision time is not coincident with the actual starter behavior time and the no-load signal NL (the input potential to a CPU) goes high in level, thus ensuring an accurate decision on the in-gear state without errors.

In accordance with the present invention, a gear decision system for an automatic transmission comprises a crank angle sensor for outputting a reference signal corresponding to a speed of an engine, a turbine speed sensor for sensing a speed of a turbine of the automatic transmission, a no-load switch for outputting a no-load signal when a shift lever is positioned so that said automatic transmission causes a no-load condition, engine stop decision means for making a decision on an engine stopping state on the basis of the reference signal, turbine speed decision means for comparing the turbine speed with a first set value corresponding to a speed at the time of an occurrence of an engine stall, speed change decision means for making a decision on a speed change state of the automatic transmission on the basis of the reference signal and the turbine speed, start decision means for making a decision on a starting state of the engine, and gear decision means for making a decision on an in-gear state of the automatic transmission on the basis of the no-load signal and the decision results of the engine stop decision means, the turbine speed decision means, the speed change decision means and the start decision means, the gear decision means deciding, over a predetermined time period, that the automatic transmission takes the out-of-gear state, when the in-gear state of the automatic transmission is indeterminable.

Further, in the gear decision system for an automatic transmission according to this invention, the gear decision means includes a counter for making a decision on the in-gear state of the automatic transmission, and sets the value of the counter to a given value corresponding to the predetermined time period when a decision is made that the engine is in the starting state, while resetting the counter value to zero in response to a decision to the engine stopping state, the turbine speed below the first set value, the speed change state of the automatic transmission or the presence of the no-load signal with a low level indicative of the no-load state, and decrements the counter value in response to no decision to all of the engine starting state, stop state, the speed change state of the automatic transmission, the turbine speed below the first set value and the no-load state, and further decides that the automatic transmission establishes the out-of-gear state when the counter value is not zero or when the no-load signal assumes a low level, while deciding that the automatic transmission takes the in-gear state when the counter value is zero and the no-load signal does not take a low level.

Furthermore, in the gear decision system for an automatic transmission according to this invention, the speed change decision means outputs a decision result indicative of the speed change state of the automatic transmission when the turbine speed exceeds a second set value corresponding to a speed at the engine start-up after an install of the engine and under any one of the three conditions: the turbine speed goes below a third set value corresponding to a speed at the in-gear state, a variation of the turbine speed goes above a fourth set value, and the no-load signal assumes a low level.

Moreover, the gear decision system for an automatic transmission according to this invention further comprises a vehicle speed sensor for sensing a speed of a motor vehicle and vehicle speed decision means for comparing the vehicle speed with a predetermined set value, and gear decision means resets the counter value to zero when the comparison result is that the vehicle speed exceeds the predetermined set value. The addition of this vehicle speed condition can reduce the case that the decision on the in-gear state is impossible.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
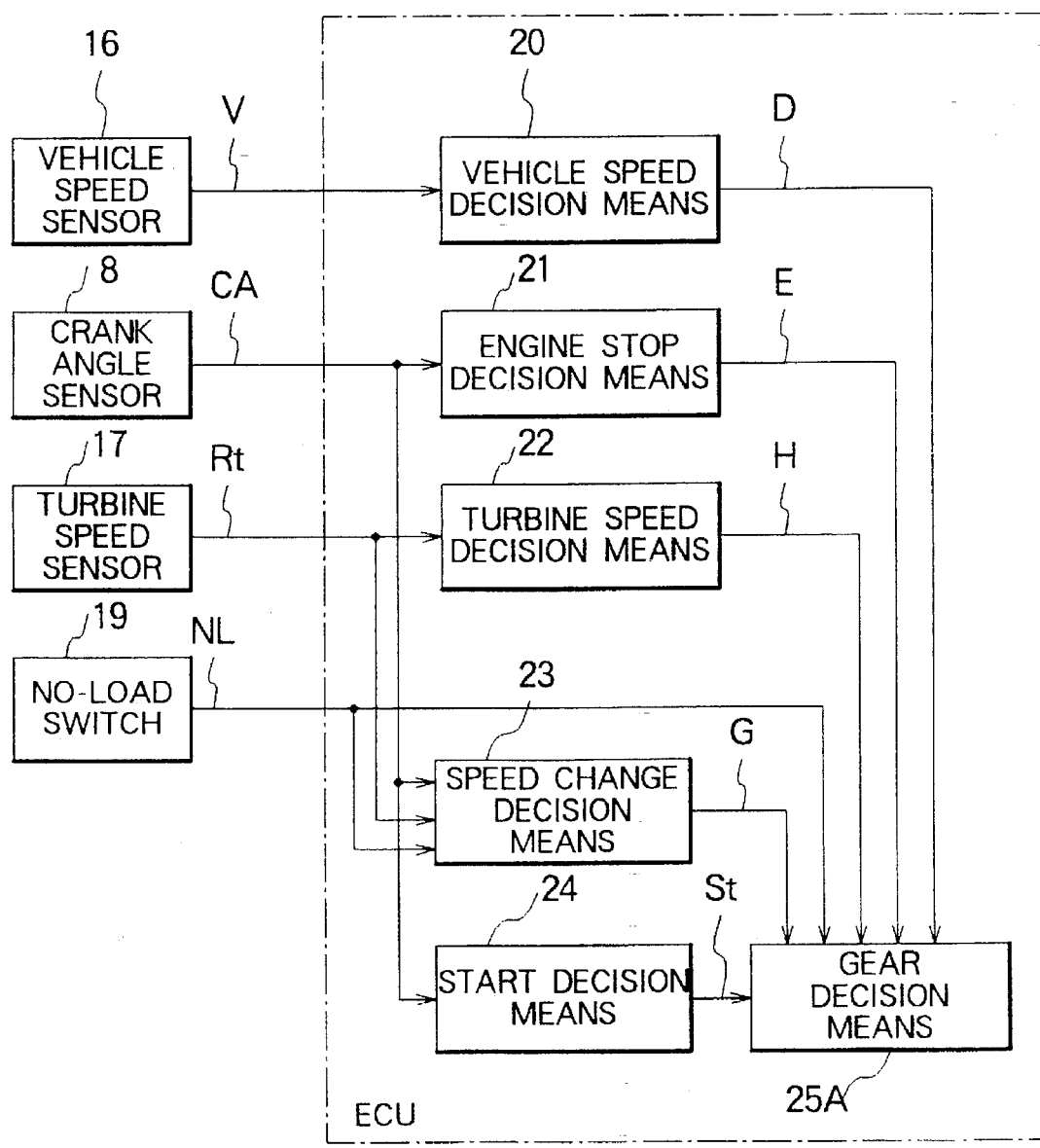
FIG. 1 is a block diagram showing an arrangement of an automatic transmission gear decision system according to a first embodiment of the present invention.
Figure 6:
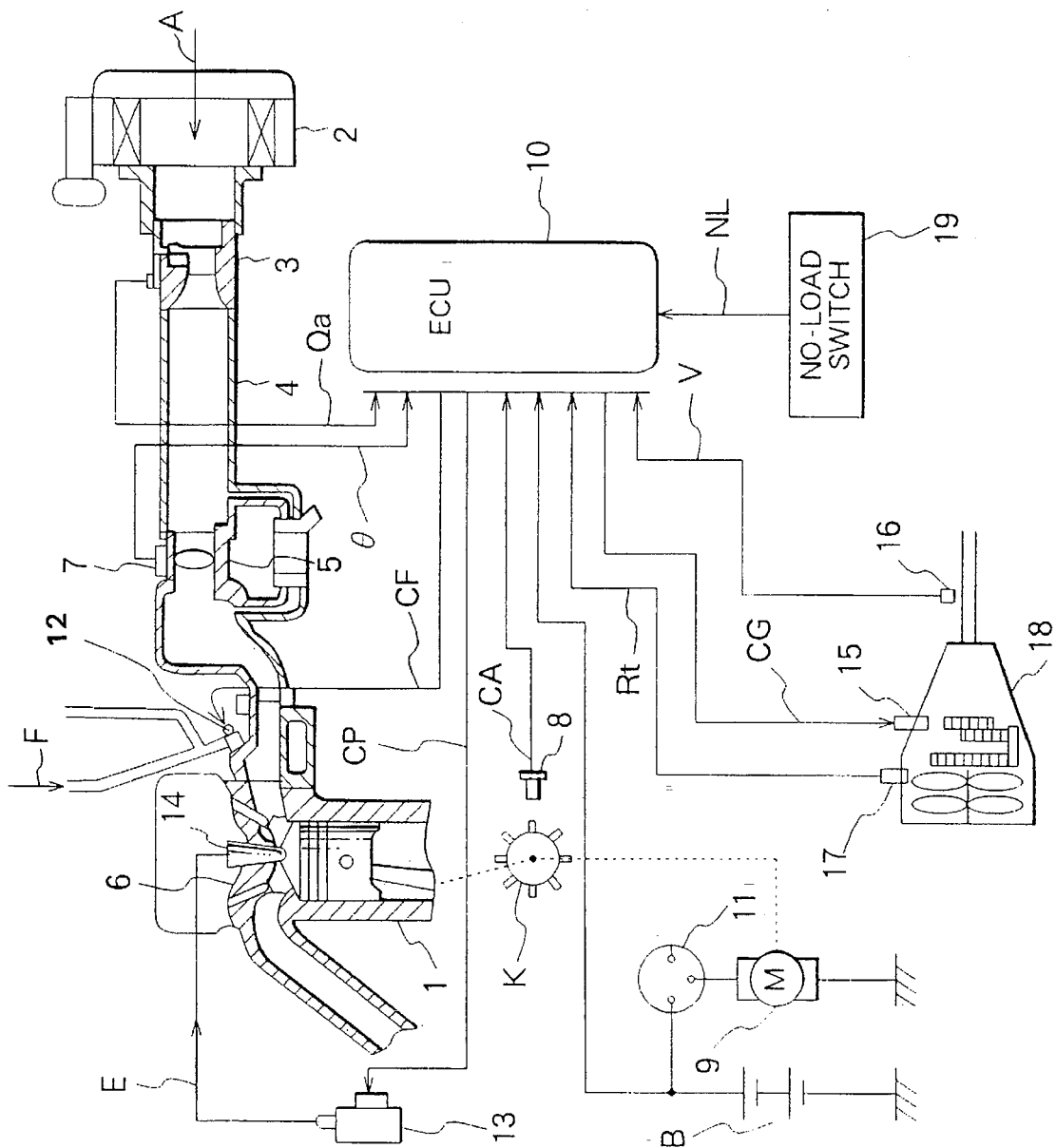
FIG. 6 is an illustration of a known engine system of a motor vehicle.
Figure 7:
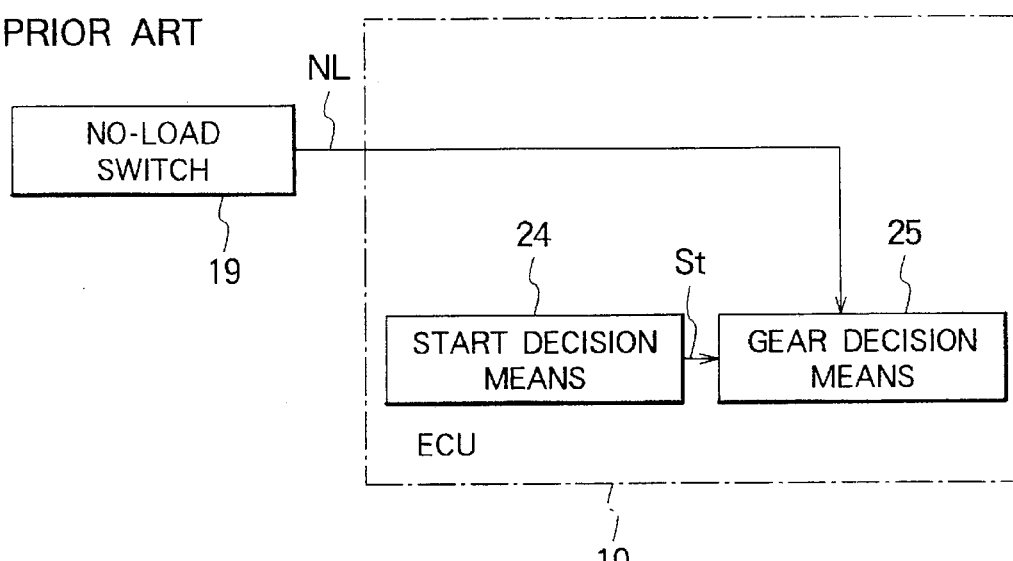
FIG. 7 is a block diagram showing an arrangement of a prior gear decision system.

Referring now to the block diagram of FIG. 1, a description will be made hereinbelow of a gear decision system for an automatic transmission according to a first embodiment of the present invention. In FIG. 1, a crank angle sensor 8, a turbine speed sensor 17, a no-load switch 19 and a start decision means 24 are the same in function and construction as those as mentioned above. Further, an ECU 10A and a gear decision means 25A are in corresponding relation to the aforesaid ECU 10 and the gear decision means 25, respectively, and arrangement portions not shown are identical to those as shown in FIG. 6. In this instance, the ECU 10A has not only the start decision means 24 and the gear decision means, but also a vehicle speed decision means 20, an engine stop decision means 21, a turbine speed decision means 22 and a speed change decision means 23.

A vehicle speed sensor 16 detects a speed V of a motor vehicle and supplies a signal indicative of the vehicle speed V to the vehicle speed decision means 20 within the ECU 10A. The crank angle sensor 8 delivers a reference signal CA corresponding to the engine speed Re to the engine stop decision means 21, the speed change decision means 23 and the start decision means 24 within the ECU 10A. The turbine speed sensor 17, placed within an automatic transmission 18 (see FIG. 6), supplies a signal representative of a turbine speed Rt to the turbine speed decision means 22 and the speed change decision means 23 within the ECU 10A. The no-load switch 19 gives a no-load signal NL to the speed change decision means 23 and the gear decision means 25A. The vehicle speed decision means 20 supplies the gear decision means 25A with a decision result D indicative of a vehicle travelling state when the vehicle speed V exceeds a predetermined vehicle speed corresponding to the vehicle travelling state. The engine stop decision means 21 supplies the gear decision means 25A with a decision result E representative of that the engine is stopping, when the reference signal CA corresponding to the engine speed Re represents the engine stop state. The turbine speed decision means 22 supplies the gear decision means 25A with a decision result H indicative of an engine stall state when the turbine speed Rt goes below a given speed corresponding to the engine stall state.

Figure 8:
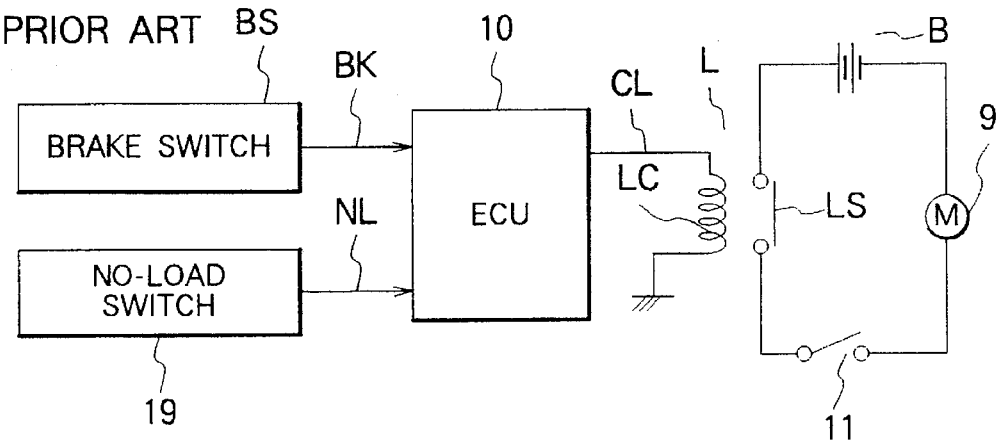
FIG. 8 illustrates a circuit arrangement for allowing cranking only when a no-load switch is in the on-state.

In addition, the speed change decision means 23 outputs a decision result G representative of a speed change state of the automatic transmission 18 when the turbine speed Rt exceeds a given speed (second set value) corresponding to a speed at the engine start-up after an install of the engine, and under any one of the three conditions: the turbine speed Rt goes below a given speed (third set value) corresponding to a speed at the in-gear state, a variation ΔRt of the turbine speed Rt goes above a given variation (fourth set value) taken at the gear change, and the no-load signal NL takes a low level representing a no-load state. The decision result G being inputted into the gear decision means 25A. The start decision means 24 makes a decision on the starting state on the basis of, for example, the reference signal CA (engine speed Re) from the crank angle sensor 8 without using the signal from the starter switch 11 (see FIG. 8), and supplies a start signal St as a decision result to the gear decision means 25A as mentioned above. The gear decision means 25A within the ECU 10A decides whether or not the automatic transmission 18 takes the in-gear state, on the basis of the no-load signal NL from the no-load switch 19 and the decision results D, E, H and G from the respective decision means 20 to 24.

Figure 2:
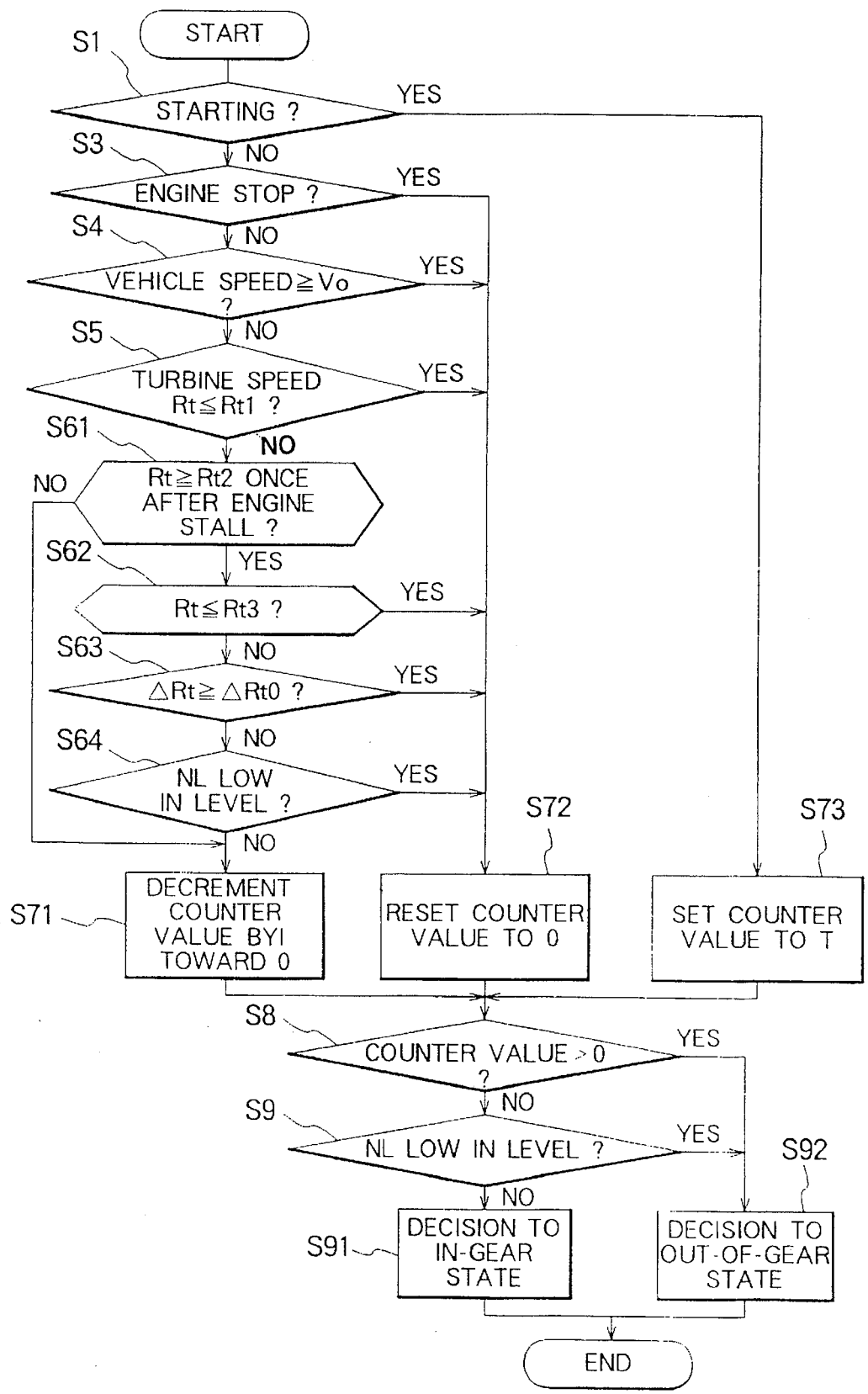
FIG. 2 is a flow chart showing an operation of the gear decision system according to the first embodiment.

Secondly, referring to the flow chart of FIG. 2, a description will be made hereinbelow of the operation of the FIG. 1 gear decision system. The gear decision means 25A includes a counter which is designed to be set, cleared and decremented in accordance with the no-load signal NL and the output signals of the respective decision means 20 to 24, and is made to decide in the in-gear state after the elapse of a predetermined time period (generally corresponding to the time for which the starter switch 11 is in the on-state) in the case of an operating condition which makes it difficult to render a decision on the in-gear state. In FIG. 2, the steps S1, S3, S4 and S5 correspond to the decision means 24, 21, 20 and 22, respectively, and the steps S61 to S64 corresponds to the speed change decision means 23, and further the steps S71 to S73, S8, S9, S91 and S92 correspond to the gear decision means 25A.

In the step S1, the start decision means 24 decides whether or not the present operating condition is a starting state. If being the starting state (that is, the answer is YES), the operational flow goes to the step S73 for setting the counter value (which will be described later). On the other hand, if being not the starting state (that is, the answer is NO), the operational flow advances to the step S3. In the step S3, the engine stop decision means 21 decides, on the basis of the reference signal CA, whether or not the engine 1 (see FIG. 6) is stopping. If the engine 1 is stopping (that is, YES), this step S3 is followed by the step S72 for clearing the counter value (which will be described later). On the other hand, if the engine 1 is not stopping (that is, NO), the same step is followed by the step S4. In the step S4, the vehicle speed decision means 20 decides whether or not the vehicle speed V exceeds a predetermined set value Vo (whether or not the vehicle is in a travelling state). If V≦Vo (that is, YES), the operational flow goes to the step S72, whereas if V<Vo (that is, NO), the operational flow proceeds to the step S5. The set vehicle speed value Vo is a comparison reference value for decision on the vehicle travelling state, and set to approximately 2 to 3 km/h.

In the step S5, the turbine speed decision means 22 decides whether or not the turbine speed Rt is below a first set value Rt1 (corresponding to the engine stall state). If Rt≦Rt1 (that is YES), the operational flow goes to the step S72, otherwise (if Rt>Rt1, that is, NO) the operational flow advances to the step S61. The first set value Rt1 is a comparison reference value for detecting the engine stall state, and set to approximately 100 rpm.

In the step S61, the speed change decision means 23 decides whether or not the turbine speed Rt exceeds a second set value Rt2 (Rt≧Rt2) at least one time after the engine stall. If Rt≧Rt2 (that is, YES), the step S61 is followed by the step S62, otherwise (Rt<Rt2, that is, NO) the same step is followed by the step S71 for decrementing the counter value (which will be described later). The second set value is a comparison reference value for detecting the state at start-up, and set to approximately 600 rpm. Accordingly, if the decision of the step S61 is affirmative (YES), a detection is made that the engine 1 has started normally in the stopping state.

Subsequently, in the step S62, the speed change decision means 23 decides whether or not the turbine speed Rt goes below a third set value corresponding to a speed at the in-gear state (Rt≦Rt3). If Rt≦Rt3 (that is, YES), the operation goes to the step S72. On the other hand, if Rt<Rt3 (that is, NO), the operation proceeds to the step S63. The third set value Rt3 is a comparison reference value for detecting the state at the time of the automatic transmission 18 being in gear, and set to approximately 600 rpm. In addition, the second set value Rt2 and the third set value Rt3 can be the same, while they are determined to satisfy the relationship of Rt2≧Rt3. As a rule, the turbine speed Rt in a motor vehicle with an automatic transmission becomes higher in the no-load condition (at start-up) than in the in-gear state while the motor vehicle is stopping, and therefore, if the second and third set values Rt2 and Rt3 are set to approximately 600 rpm, on the basis of the turbine speed Rt it is possible to substantially make a decision as to whether or not the automatic transmission 18 is in gear.

Figure 9:
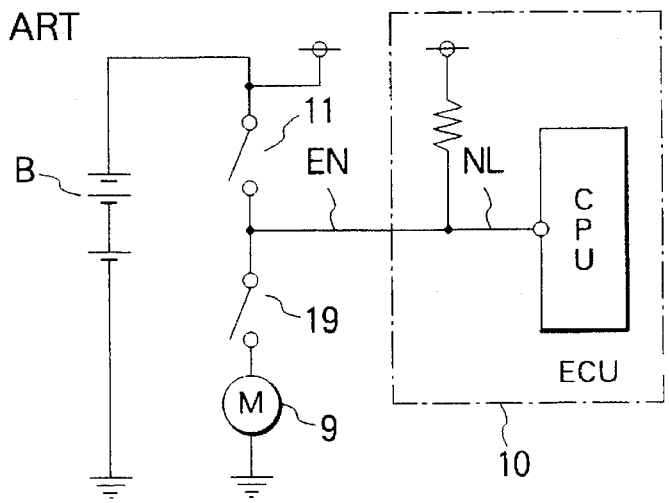
FIG. 9 is a circuit diagram showing the relationship between the no-load switch and a starter switch.

Then, in the step S63, the speed change decision means 23 decides whether or not a variation ΔRt of the turbine speed Rt exceeds a fourth set value ΔRto corresponding to a variation at a gear change (ΔRt≧ΔRto). If ΔRt≧ΔRto (that is, YES), the operation goes to the step S72, otherwise (ΔARt<ΔRto, that is, NO) the operation advances to the step S64. In the step S64, the speed change decision means 23 decides whether or not the no-load signal NL (the input potential to the CPU in FIG. 9) gets into a low-level state. If being low in level (that is, YES), the operational flow goes to the step S72, and if not low in level (that is, NO), the operational flow proceeds to the step S71.

That is, in the steps S61 to S64, the speed change decision means 23 outputs the decision result G indicative of the speed change state of the automatic transmission under the condition of Rt ≧Rt2 being satisfied at least one time and simultaneously under any one of the following three conditions: Rt≦Rt3, ΔRt≧ΔRto, and the no-load signal NL being low in level.

In a case where all the decision results of the decision steps S3 to S5 and S61 are NO or where the decision result of the step S61 is YES while all the decision results of the steps S62 to S64 are NO, the gear decision means 25A encounters an indeterminable condition in making a decision on the in-gear state. Whereupon, in the step S71 the counter value is decremented by one toward zero so that the decision in the no-load state is compulsorily continued for a given time period. Further, in a case where one of the decision steps S62 to S64 is YES (determinable state), in the step S72 the counter value is reset (cleared) to zero to allow the decision on the in-gear state. Moreover, if the decision result (start signal St) of the start decision means 24 is indicative of a starting state, in the step S73 the counter value is set to a predetermined value T so that the no-load state is compulsorily decided.

Thereafter, in the step S8, the gear decision means 25A first compares the counter value with zero to check whether the counter value is greater than zero (whether or not to compulsorily presume that the engine is in the no-load state). If counter value>0 (that is, YES), the step S92 follows to make a decision that the automatic transmission 18 is in the out-of-gear state (no-load state). After this step, the decision operation terminates. On the other hand, if counter value=0 (that is, NO), the step S9 follows to check whether or not the no-load signal NL takes a low level state. If the no-load signal NL is low in level (that is, YES), the step S92 is subsequently implemented to decide that the automatic transmission 18 is in the out-of-gear state. Then, the operation comes to an end. Meanwhile, if the no-load signal NL is not low in level (that is, NO), the operational flow goes to the step S91 to make a decision that the automatic transmission 18 is in the in-gear state. After this step, the operation ends.

Thus, because the counter value is set to the predetermined value T at the time of the decision on start-up (step S1), the operational flow advances to the step S92 when counter value>0 (step S8) so as to inhibit the decision that the automatic transmission 18 is in the in-gear state.

Furthermore, in a case where after the start-up of the engine the steps S3 to S5 show the affirmative decisions or in a case where the step S61 shows the affirmative decision and one of the steps S62 to S64 indicates the affirmative decision, since the operation comes into an in-gear state determinable condition, if the counter value is immediately set to zero, the decision (step S91) on the in-gear state becomes possible under the conditions of counter value=0 (step S8) and the no-load signal NL being low in level (step S9). Also, in a case where after the start-up of the engine the in-gear state indeterminable condition continues for more than a predetermined time period and the step S71 causes the counter value to be zero, the decision (step S91) on the in-gear state becomes possible under the condition of the no-load signal NL being high in level (step S9).

In this instance, even if the step S8 decides that counter value =0, when the step S9 decides that the no-load signal NL is low in level (no-load state), because of the no-load decision result in the step S9 taking precedence, the operational flow goes to the step S92, whereby it is possible to avoid the erroneous decision on the in-gear state.

In a motor vehicle with the automatic transmission 18 (see FIG. 6), the gear decision operation described above can prevent the erroneous decision on the in-gear state at the time of the cranking. For example, in the case that the in-gear state is taken because the driver operates the shift lever during stopping, a power is transferred to a stopping wheel so that the turbine speed Rt lowers, and hence the steps S62 or S63 decides on the lowering or variation of the turbine speed Rt. Accordingly, with counter value=0 set in the step S72, it is possible to accurately make a decision on the in-gear state.

Assuming that the operation does not include the decision steps S61 to S64, the operational flow enters the decrement step S71 even if the shift lever is operated immediately after the engine start-up (actually, such a shift lever operation is impossible) so that the automatic transmission 18 gets into the in-gear state. In this case, a given time is taken until the counter value reaches zero and the decision during that time results in the no-load state.

Furthermore, if the decision of the step S3 is that the engine is in a stopping state, the counter value is immediately set to zero (step S72), for that there is no possibility that the decision makes an error. In addition, because the vehicle speed V can not actually exceeds the set value Vo (travelling state) in the starting condition of the engine, when the decision of the step S4 is that the vehicle speed V is above the set value Vo, the counter value is immediately set to zero (step S72) so that the decision on the in-gear state goes possible. Assuming that the operation does not include the vehicle speed decision step S4, since the turbine speed Rt depends upon the vehicle speed V in the case that the shift lever is operated immediately after the start-up of the engine so that the motor vehicle travels with the in-gear state, the in-gear state decision based on only the turbine speed Rt can more or less be inaccurate.

Accordingly, a quick and accurate decision on the in-gear state is possible in such a way that the counter value is reset to zero (step S72) when the condition of the vehicle speed decision step S4 (V≧Vo) is satisfied.

Figure 3:
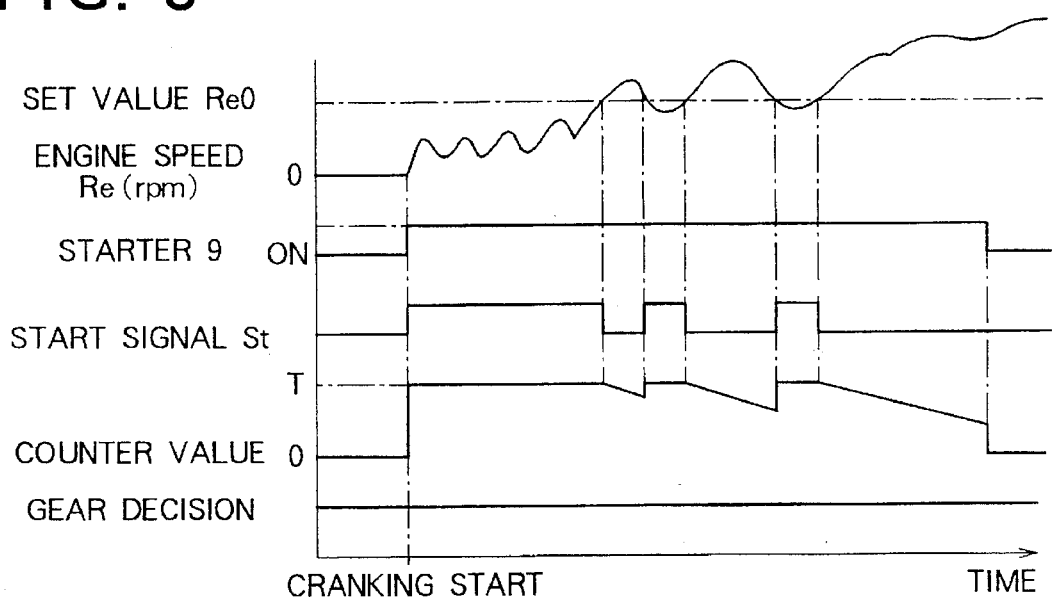
FIG. 3 is a time chart useful for explaining the operation of the gear decision system according to the first embodiment.
Figure 10:
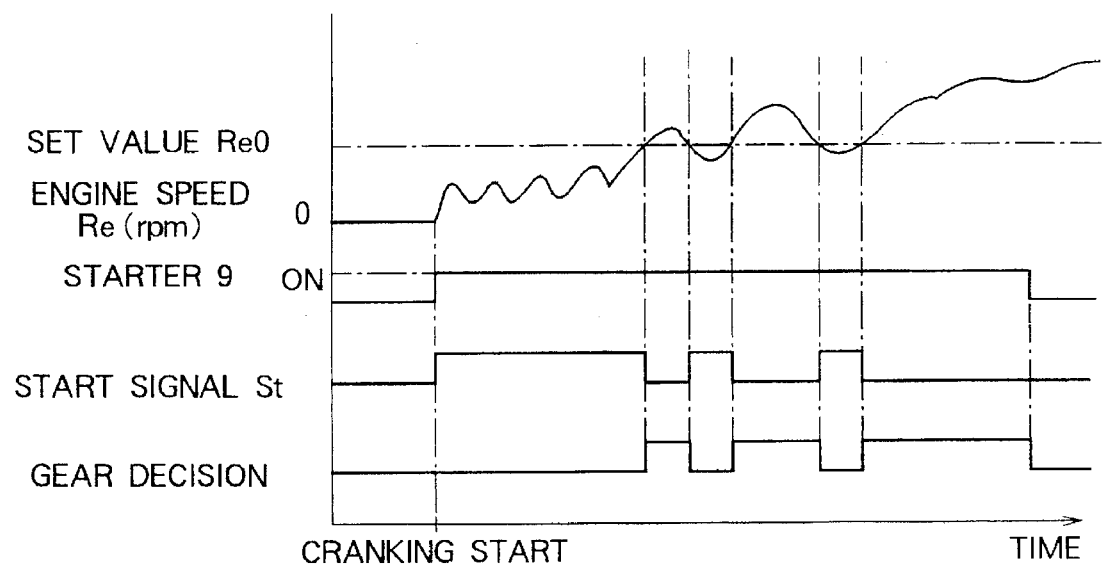
FIG. 10 is a time chart showing a prior shift position decision operation.

Furthermore, a description will be made hereinbelow of an erroneous decision suppressing operation in this embodiment with reference to a time chart of FIG. 3 (corresponding to FIG. 10). In the case that the start decision means 24 provides the start decision signal St on the basis of the engine speed Re, when as shown in FIG. 3 the engine speed Re goes above the set value Reo, the decision is not made that the engine is in the starting state and, hence, the actual on-time period (cranking time period) of the starter 9 (see FIG. 6) is different from the generation time period (start decision time period) of the start signal St. However, over the unstable time period for which the level for the on-time period of the starter 9 is different from the level of the start signal St, the counter value within the gear decision means 25A varies so as to decrease gradually from the initially set predetermined value T, whereby it is possible to prevent the erroneous decision on the in-gear state for a give time period. During the cranking time period, the engine speed Re does not exceed the set value Reo for a long time, and hence, if the counter value T is appropriately determined, the erroneous decision on the in-gear state is surely avoidable.

Moreover, when the starter 9 is turned off, the no-load switch 19 (see FIG. 9) comes into the on-state and the starter switch 11 gets into the off-state, with the result that the no-load potential EN is grounded and the no-load signal NL to be inputted to the CPU within the ECU 10 takes the low-level state. Accordingly, the CPU (speed change decision means 23 and the gear decision means 25A) decides that the no-load signal NL represents a low level, and the gear decision means 25A clears the counter value to zero (step S72). As a result, at the time of the start-up of the engine, the decision is compulsorily made, on the basis of the counter set value T irrespective of the level of the no-load signal NL (input potential to the CPU), that the automatic transmission 18 is in the out-of-gear state (no-load state), which can surely prevent the erroneous decision on the in-gear state. Further, in the case that the operating condition is settled, for example, when the shift lever is operated, the counter value within the gear decision means 25A is immediately reset in accordance with the decision result G of the speed change decision means 23. Whereupon, if the no-load signal NL is high in level, the in-gear state can immediately be decided without any time lag.

Figure 4:
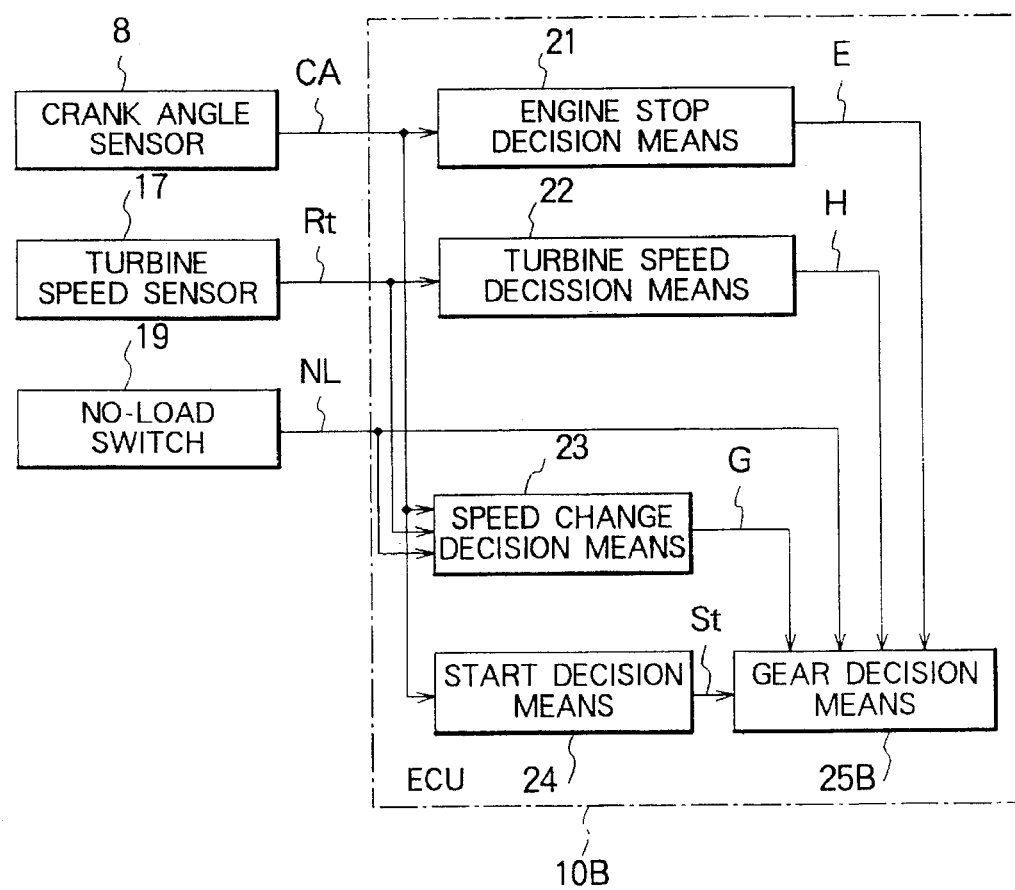
FIG. 4 is a block diagram showing an arrangement of an automatic transmission gear decision system according to a second embodiment of the present invention.

Furthermore, a description will be made hereinbelow of a second embodiment of this invention. Although in the above described first embodiment the vehicle speed sensor 16 for detecting the vehicle speed V and the vehicle speed decision means 20 are provided in order to quickly decide on the in-gear state at the time of the abnormal shift lever operation immediately after the start-up of the engine, if there is no need for such vehicle speed decision conditions to be particularly taken into consideration, the operation can be accomplished without using the operating information, i.e., the vehicle speed V. FIG. 4 is a block diagram showing an arrangement of a gear decision system according to the second embodiment of this invention. The arrangement is the same as that of FIG. 1 except for no provision of the vehicle sensor 16 and the vehicle speed decision means 20. In FIG. 4, an ECU 10B and a gear decision means 25B correspond to the aforementioned ECU 10A and the gear decision means 25A, respectively. In this case, the ECU 10B does not include the vehicle speed decision means 20, and the gear decision means 25B decides on the in-gear state on the basis of the no-load signal NL and the output signals of the decision means 21 to 24.

Figure 5:
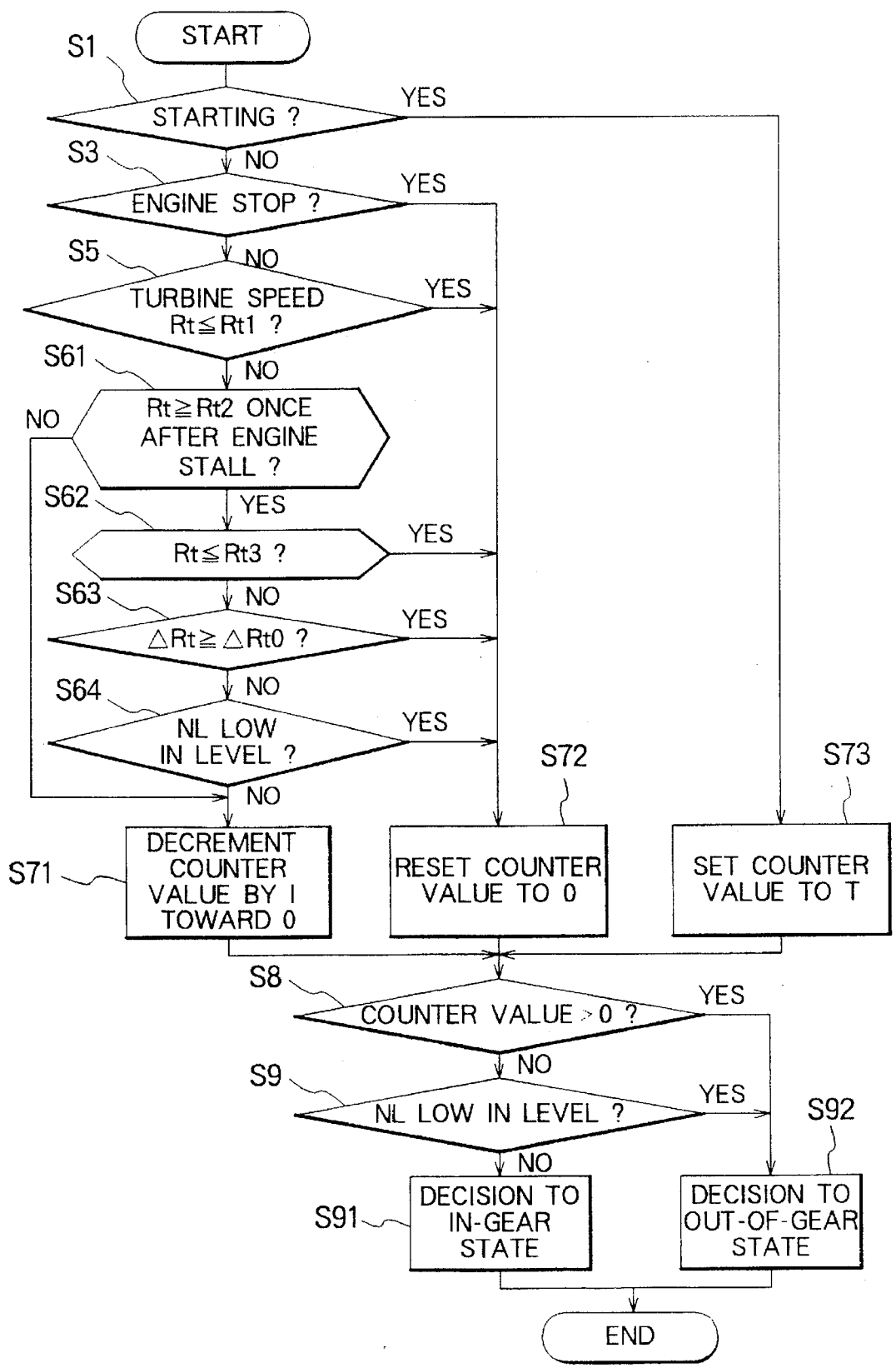
FIG. 5 is a flow chart showing an operation of the gear decision system according to the second embodiment.

FIG. 5 is a flow chart showing the operation of the gear decision system according to the second embodiment. This control operation is the same as that of FIG. 2 except for no provision of the vehicle speed detection step S4. In accordance with this operation, when the step S3 decides that the engine is not in the stopping state (that is, NO), the control immediately goes to the step S5.

According to the second embodiment of this invention as shown in FIGS. 4 and 5, it is possible to make a decision on the in-gear information with little broken reliability. Accordingly, this system is applicable to a motor vehicle not equipped with the vehicle speed sensor 16. That is, the erroneous decision on the in-gear state does not take place during the start-up (cranking), and a decision can be made instantaneously that the automatic transmission 18 is in the in-gear state, when the shift lever changes from the N or P position to a different position.

Although in the above-described embodiments the start decision means 24 outputs the start signal St on the basis of the reference signal CA (engine speed Re), it is also appropriate that, for example, the decision is made on the basis of the operating signal of the starter switch 11 and various information. For this reason, this invention is applicable to a variety of different engine control systems.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A gear decision system for an automatic transmission comprising:

a crank angle sensor for outputting a reference signal corresponding to a speed of an engine;

a turbine speed sensor for sensing a speed of a turbine of said automatic transmission;

a no-load switch for outputting a no-load signal when a shift lever is positioned so that said automatic transmission makes a no-load condition;

engine stop decision means for making a decision on a stopping state of said engine on the basis of said reference signal;

turbine speed decision means for comparing the detected turbine speed with a first set value corresponding to a speed at the time of an occurrence of an engine stall;

speed change decision means for making a decision on a speed change state of said automatic transmission on the basis of said reference signal and said turbine speed;

start decision means for making a decision on a starting state of said engine; and gear decision means for making a decision on whether or not said automatic transmission takes an in-gear state, on the basis of said no-load signal and the decision results of said engine stop decision means, said turbine speed decision means, said speed change decision means and said start decision means, said gear decision means deciding, over a predetermined time period, that said automatic transmission takes an out-of-gear state, when the in-gear state of said automatic transmission is indeterminable.

2. A gear decision system as defined in claim 1, wherein said gear decision means for making a decision on the in-gear state of said automatic transmission, includes a counter and controls said counter as follows:

setting said counter to a given value corresponding to said predetermined time period when a decision is made that said engine is in the starting state;

resetting the counter value to zero when a decision is made that said engine is in the stopping state, when a decision is made that said turbine speed is below said first set value, when a decision is made that said automatic transmission is in the speed change state, or when a decision is made that said no-load signal takes a low level indicative of the no-load state; and decrementing the counter value in response to a no decision to all of the engine starting state, the stopping state, the speed change state of said automatic transmission, the turbine speed below said first set value and the no-load state, said gear decision means deciding that said automatic transmission is in the out-of-gear state when the counter value is not zero or when said no-load signal takes a low level, while deciding that said automatic transmission takes the in-gear state when the counter value is zero and said no-load signal does not take a low level.

3. A gear decision system as defined in claim 1, wherein said speed change decision means outputs a decision result indicative of the speed change state of said automatic transmission when the turbine speed exceeds a second set value corresponding to a speed at the starting state of said engine after a install of said engine and when satisfied is any one of three conditions: said turbine speed goes below a third set value corresponding to a speed at the in-gear state, a variation of said turbine speed goes above a fourth set value, and said no-load signal takes a low level.

4. A gear decision system as defined in claim 2, further comprising a vehicle speed sensor for sensing a speed of a motor vehicle and vehicle speed decision means for comparing the sensed vehicle speed with a predetermined set value, and wherein said gear decision means resets the counter value to zero when the comparison result is that the vehicle speed exceeds said predetermined set value.

* * * * *